United States Patent [19]

Lee

[11] Patent Number: 5,611,103
[45] Date of Patent: Mar. 18, 1997

[54] WINDSHIELD WIPER FRAME CONNECTOR WHICH ACCOMODATES DIFFERENT SIZE WIPER ARMS

[76] Inventor: Albert Lee, 232 Margate Rd., Timonium, Md. 21093

[21] Appl. No.: 337,837

[22] Filed: Nov. 8, 1994

Related U.S. Application Data

[63] Continuation-in-part of Ser. No. 118,663, Sep. 10, 1993, abandoned, and a continuation-in-part of Ser. No. 180,387, Jan. 12, 1994, abandoned.

[51] Int. Cl.$^6$ ...................................................... B60S 1/40
[52] U.S. Cl. ........................... 15/250.32; 15/250.44
[58] Field of Search ........................... 15/250.32, 250.31, 15/250.44, 250.43, 250.361, 250.48, 250.46

[56] References Cited

U.S. PATENT DOCUMENTS

| | | | |
|---|---|---|---|
| 3,425,089 | 2/1969 | Quinlan et al. | |
| 3,780,395 | 12/1973 | Quinlan et al. | |
| 4,370,775 | 2/1983 | Van den Berg et al. | 15/250.32 |
| 4,443,907 | 4/1984 | Chamberlain | 15/250.32 |
| 4,670,934 | 6/1987 | Epple et al. | 15/250.32 |
| 5,084,933 | 2/1992 | Buechele | 15/250.32 |
| 5,289,608 | 3/1994 | Kim . | |

FOREIGN PATENT DOCUMENTS

| | | | |
|---|---|---|---|
| 53960 | 6/1982 | European Pat. Off. | 15/250.32 |
| 2600292 | 12/1987 | France | 15/250.32 |
| 2621360 | 4/1989 | France | 15/250.32 |
| 3618326 | 12/1987 | Germany | 15/250.32 |
| 609287 | 2/1979 | Switzerland | 15/250.32 |
| 2034580 | 6/1980 | United Kingdom | 15/250.32 |
| 2119637 | 11/1983 | United Kingdom | 15/250.32 |
| 2163042 | 2/1986 | United Kingdom | 15/250.32 |
| 2168243 | 6/1986 | United Kingdom | 15/250.32 |

Primary Examiner—Gary K. Graham

[57] ABSTRACT

A windshield wiper frame connector for use in a windshield wiper assembly for an automobile which accommodates different size wiper arms, wherein the wiper frame connector includes a pair of slots for receiving a pin type wiper arm. The connector also includes a lower space and an upper space for receiving two different sized hook type wiper arms, and includes an angled slot, a hole, and a bayonet lock tongue whereby a bayonet type wiper arm can be easily connected to a windshield wiper blade unit.

11 Claims, 10 Drawing Sheets

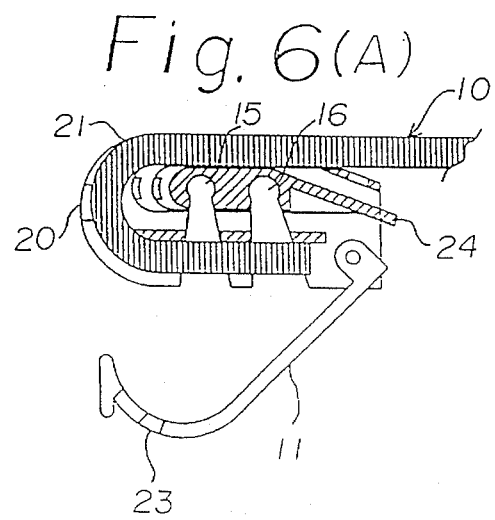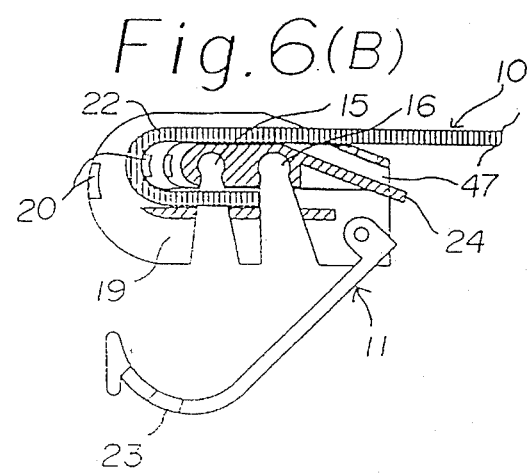

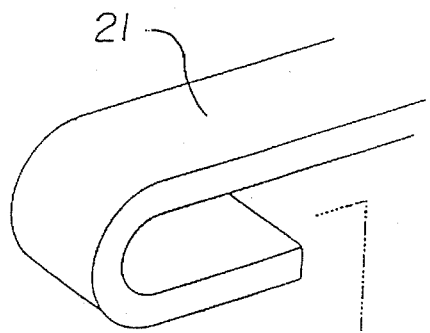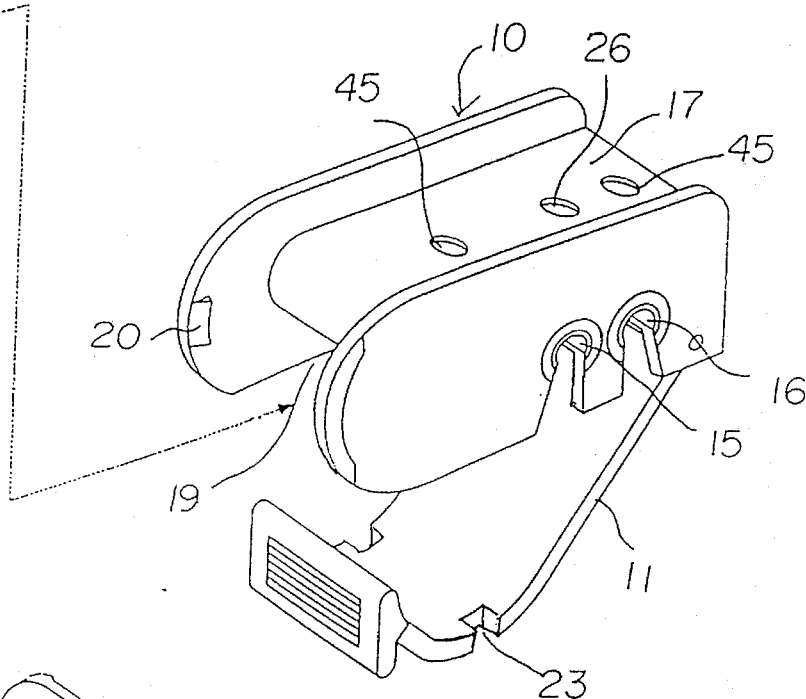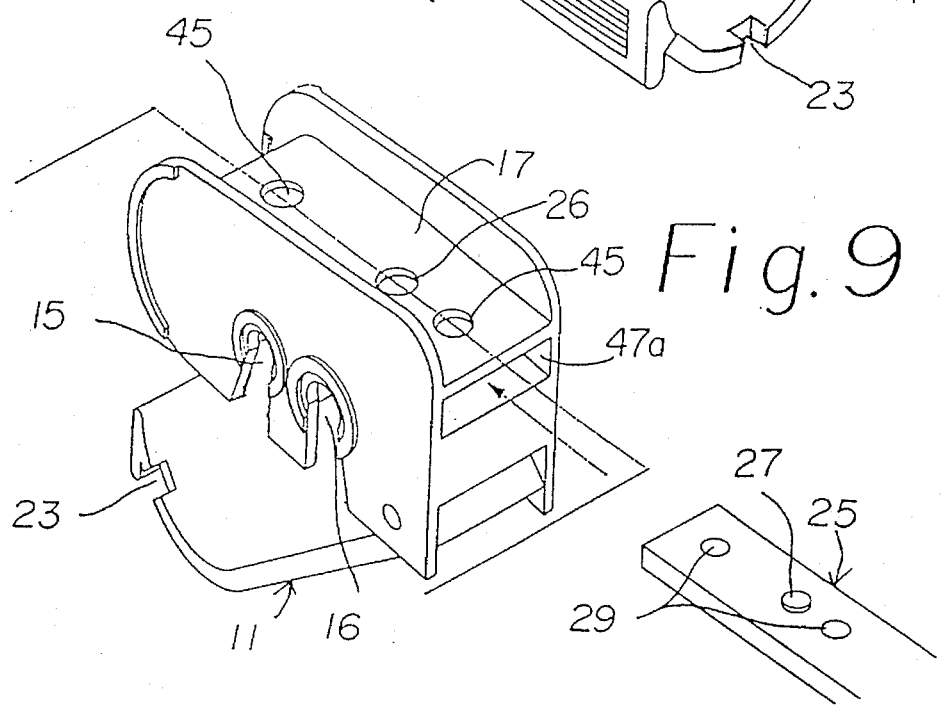

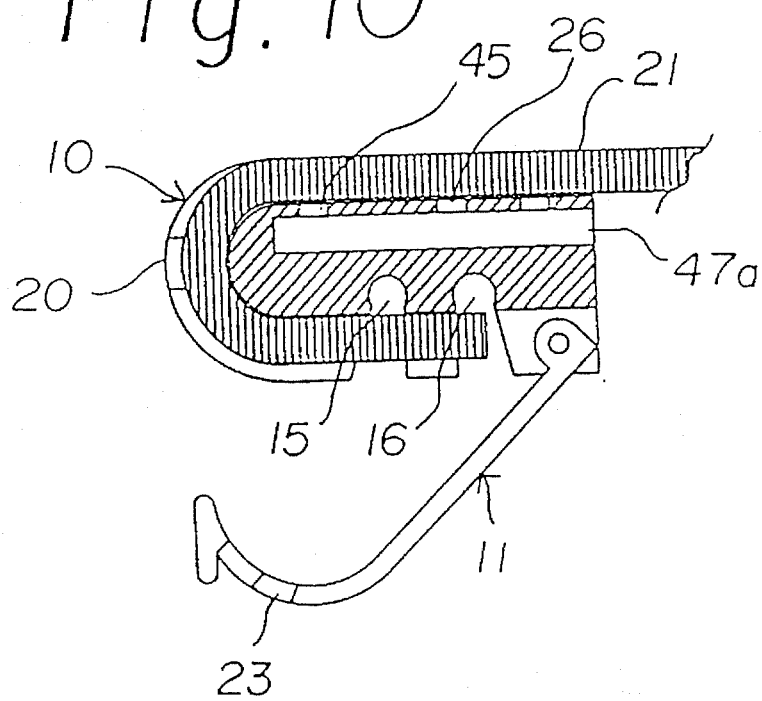

WINDSHIELD WIPER FRAME CONNECTOR WHICH ACCOMODATES DIFFERENT SIZE WIPER ARMS

CROSS-REFERENCE TO RELATED APPLICATIONS

This is a continuation-in-part application of U.S. patent application Ser. No. 08/118,663, filed on Sep. 10, 1993, now abandoned, and Ser. No. 08/180,387, filed on Jan. 12, 1994, now abandoned.

BACKGROUND OF THE INVENTION

1. Field of the Invention

The present invention relates to an improved wiper arm and blade unit connector for windshield wipers, having first and second slots disposed in a lower portion and a plurality of raised portions disposed on an exterior thereof for more tightly and rotatably mounting to a rolled bushing of a pin type wiper arm at the second slot thereof. Three pairs of aligned locking members and two pairs of stoppers are disposed on a pair of front wings thereof for slidably receiving 7 mm, 8 mm, and 9 mm wide hook type wiper arms with 8.8 mm and 11 mm diameters. An angled slot and a hole for slidably receiving and locking a bayonet type wiper arm are also provided, thereby improving the performance of the windshield wiper assembly.

2. Description of Related Art

Various types of windshield wiper arm and blade unit connectors for a windshield wiper assembly are known. Such windshield wiper frame connectors include a pair of apertured ears pivotally connected to a pin of a pin type arm as shown in U.S. Pat. No. 3,425,089 to Quinlan et al. and U.S. Pat. No. 3,780,395 to Quinlan et al. However, such conventional art wiper frame connectors are costly to manufacture and difficult to assemble with the wiper arm and the blade unit due to their complicated structure. Furthermore, such connectors are incapable of receiving the widely used hook type arm of the windshield wiper assembly which restricts their use in many applicable circumstances.

Conventionally, the windshield wiper frame connector 1 as shown in FIG. 1 is equipped with first, second, and third slots 2, 3, and 4 and an L-shaped recess 5 for receiving both the hook type arm and the pin type arm. However, the windshield wiper frame connector 1 suffers from a number of problems. For example, the difference in depth between the first slot 2 of a pin of the blade unit and the second slot 3 of a roller bushing of the pin type arm causes instability when the pin type arm is connected to the wiper frame connector 1. Moreover, when the connector receives a hook type wiper arm, the connector 1 lacks any locking members that would securely lock the hook type arm to the wiper frame connector 1. The body 6 of the wiper frame connector 1 also uses much material and is heavy in weight. These characteristics and above stated problems are disadvantages in achieving an efficient and economical windshield wiper assembly.

In order to avoid such problems, U.S. Pat. No. 5,289,608, issued to the present inventor, discloses a windshield wiper frame connector for use in a windshield wiper assembly for motor vehicles which includes a pair of slots, two pair of raised portions, and a pair of stoppers on a pair of sidewalls for forming two pairs of spaces, upper and lower elongated seats, and an angled slot and a hole, whereby a hook type wiper arm, or a pin type wiper arm, or a bayonet type wiper arm can be easily connected to a blade.

The present Applicant is also prosecuting other U.S. patent applications; Ser. No. 08/118,663, filed on Sep. 10, 1993 and Ser. No. 08/180,387, filed on Jan. 12, 1994, which disclose a windshield wiper frame connector for use in a windshield wiper assembly for motor vehicles which accommodates different size wiper arms, wherein the wiper frame connector includes a pair of slots, three pairs of raised portions and a pair of stoppers on a pair of sidewalls for forming two pairs of spaces, upper and lower elongated seats, and an angled slot, a hole, and a bayonet lock tongue whereby a hook type wiper arm, or a pin type wiper arm, or a bayonet type wiper arm can be easily connected to a blade unit.

However, these wiper frame connectors cannot accommodate different size wiper arms such as 9 mm width, 11 mm diameter and 4 mm thickness for mostly European vehicles, 9 mm width, 8.4 mm diameter and 3 mm thickness for most other vehicles, and 7 mm and 8 mm width standard hooks, as well as a bayonet type wiper having an angle of about 17°.

SUMMARY OF THE INVENTION

Accordingly, it is an object of the present invention to provide an improved windshield wiper frame connector for use in a windshield wiper assembly for motor vehicles, which eliminates the above problems encountered with conventional windshield wiper frame connectors.

Another object of the present invention is to provide an improved connector separately connected to a wiper arm such as a pin type wiper arm, a hook type wiper arm, or a bayonet type wiper arm and a blade unit having two pairs of different size apertures for a windshield wiper assembly.

A further object of the present invention is to provide a windshield wiper frame connector having a pair of slots disposed in the lower portion thereof, the first slot rotatably mounting to a transverse pin of the blade unit and the other slot rotatably receiving a roller bushing of a pin type wiper arm. Three pairs of aligned locking members and three pairs of stoppers are disposed on opposite inner surfaces of the front wings thereof such that a hook portion of a hook type wiper arm tightly engages with one of the spaces formed between the three pairs of aligned locking members of the wiper connector and a pair of stoppers. The tight engagement of the hook type wiper arm thereby improves the wiping performance of the windshield wiper assembly and extends its operational life. The three pairs of aligned locking members and three pairs of stoppers can thereby accommodate three different width hook arms. The windshield wiper frame connector also accommodates a bayonet type wiper arm, via an angled slot into which the bayonet type wiper arm can slide and a hold and a locking tongue which engages a locking portion on the bayonet type wiper arm.

Still another object of the present invention is to provide an improved wiper frame connector for use in two pairs of different size apertures.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 6(A) is a sectional view of the windshield wiper frame connector assembled with a hook type wiper arm of 9 mm width having 11 mm diameter and 4 mm thickness according to the present invention;

FIG. 6(B) is a sectional view of the windshield wiper frame connector assembled with a hook type wiper arm of 9 mm width having 8.8 mm diameter and 2.5 mm thickness according to the present invention;

FIG. 8 is a perspective view of a fifth embodiment of the windshield wiper frame connector with a clip in combination with a hook type wiper arm of 9 mm width having 11 mm diameter and 4 mm thickness according to the present invention;

FIG. 9 is a perspective view of the windshield wiper frame connector as shown in FIG. 8, in combination with a bayonet type wiper arm according to the present invention;

FIG. 10 is a sectional view of the windshield wiper frame connector as shown in FIG. 8, in assembly with a hook type wiper arm of 9 mm width having an 11 mm diameter and 4 mm thickness according to the present invention;

DETAILED DESCRIPTION OF THE PREFERRED EMBODIMENTS

Figure 1:
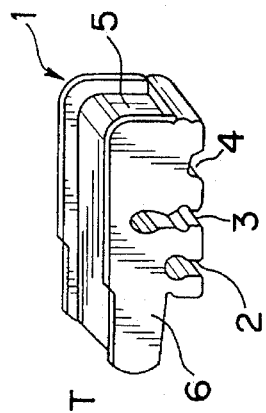
FIG. 1 is a perspective view of a conventional windshield wiper frame connector.
Figure 2:
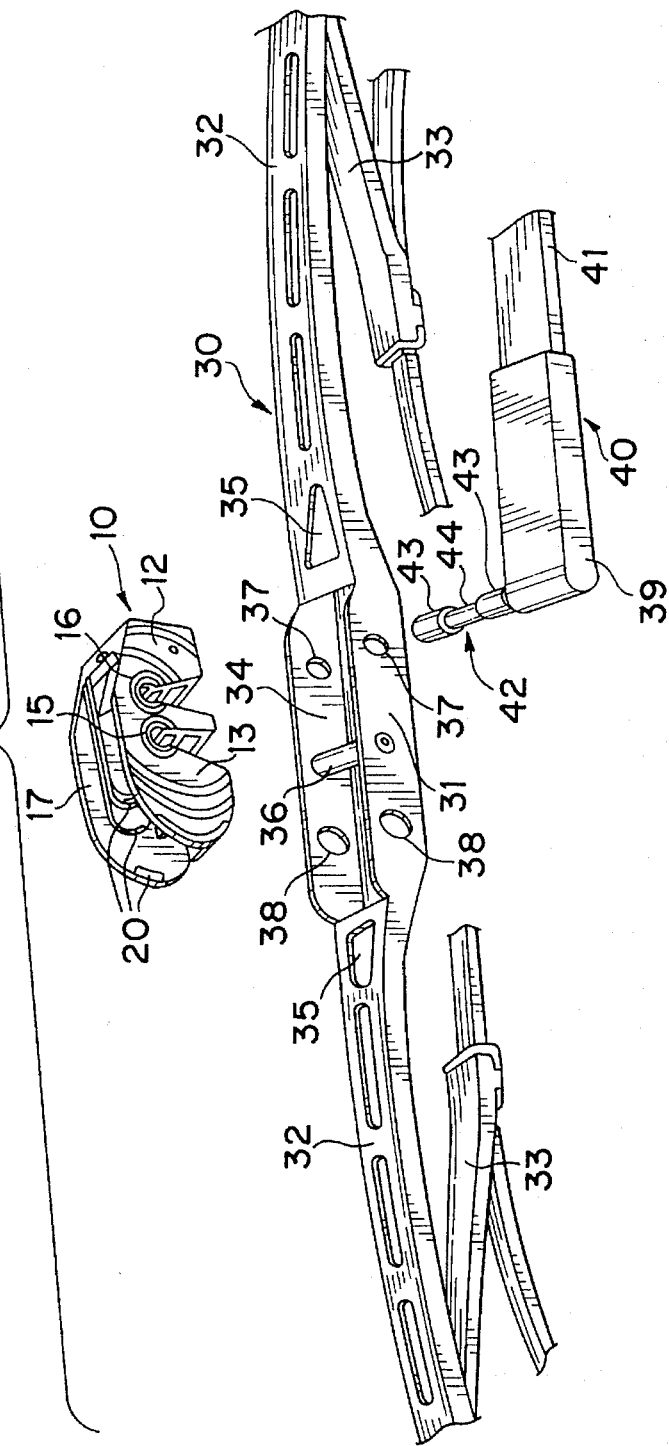
FIG. 2 is an exploded, perspective view of the windshield wiper frame connector of the present invention in combination with a blade unit having two pairs of different size apertures and a pin type wiper arm.
Figure 3:
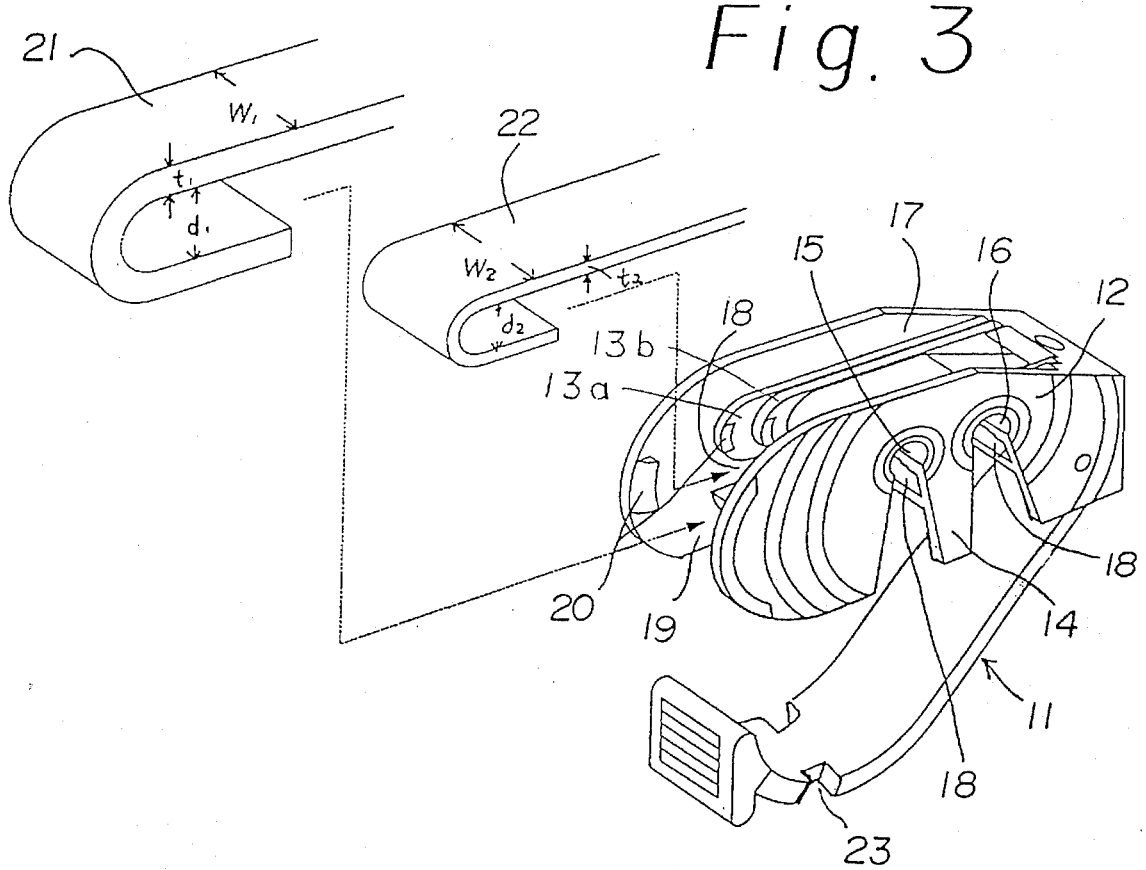
FIG. 3 is a perspective view of a windshield wiper frame connector with a clip according to the present invention in combination with two hook type wiper arms of 9 mm width, 11 mm diameter and 4 mm thickness, and 8.8 mm diameter and 2.5 mm thickness.
Figure 4:
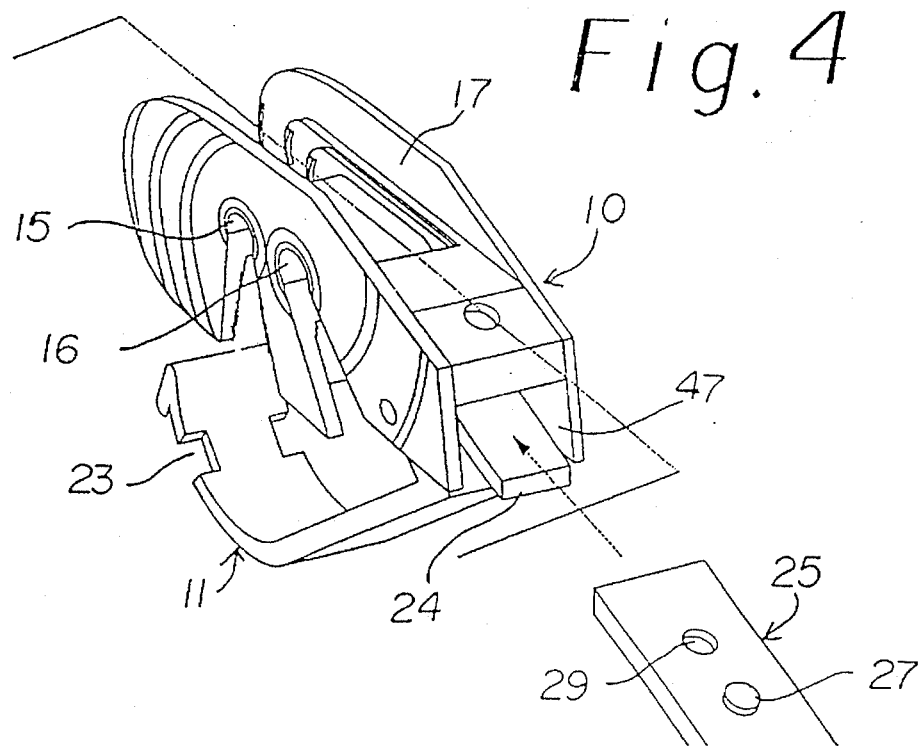
FIG. 4 is a perspective view of the windshield wiper frame connector with a clip according to the present invention in combination with a bayonet type wiper arm.

Referring now in detail to the drawings for the purpose of illustrating the preferred embodiments of the present invention. The windshield wiper frame connector 10 is designed to be connected to hook type wiper arms 21 and 22, a pin type wiper arm 40 and a bayonet type wiper arm 25, and a blade unit 30 for use in a windshield wiper assembly of an automobile as shown in FIGS. 2, 3, and 4. The windshield wiper frame connector 10 comprises a body member 12, a pair of sidewalls 14 each having a front wing portion 13, and a first slot 15 and a second slot 16 disposed in the lower portion of the body member 12.

An upper jam portion 17 is disposed on the top of the body member 12. A lower space 19 and an upper space 18 are disposed on the inside surface of the pair of front wing portions 13 of the body member 12 for receiving a first hook type wiper arm 21 and a second hook type wiper arm 22, respectively. The first hook type wiper arm 21 for use in European automobiles and trucks has a 9 mm width ($w_1$), 11 mm diameter ($d_1$) and 4 mm thickness ($t_1$), and the second hook type wiper arm 22 for use in other automobiles has 9 mm width ($w_2$), 8.8 mm diameter ($d_2$) and 2.5 mm thickness ($t_2$), as shown in FIG. 3.

Figure 5:
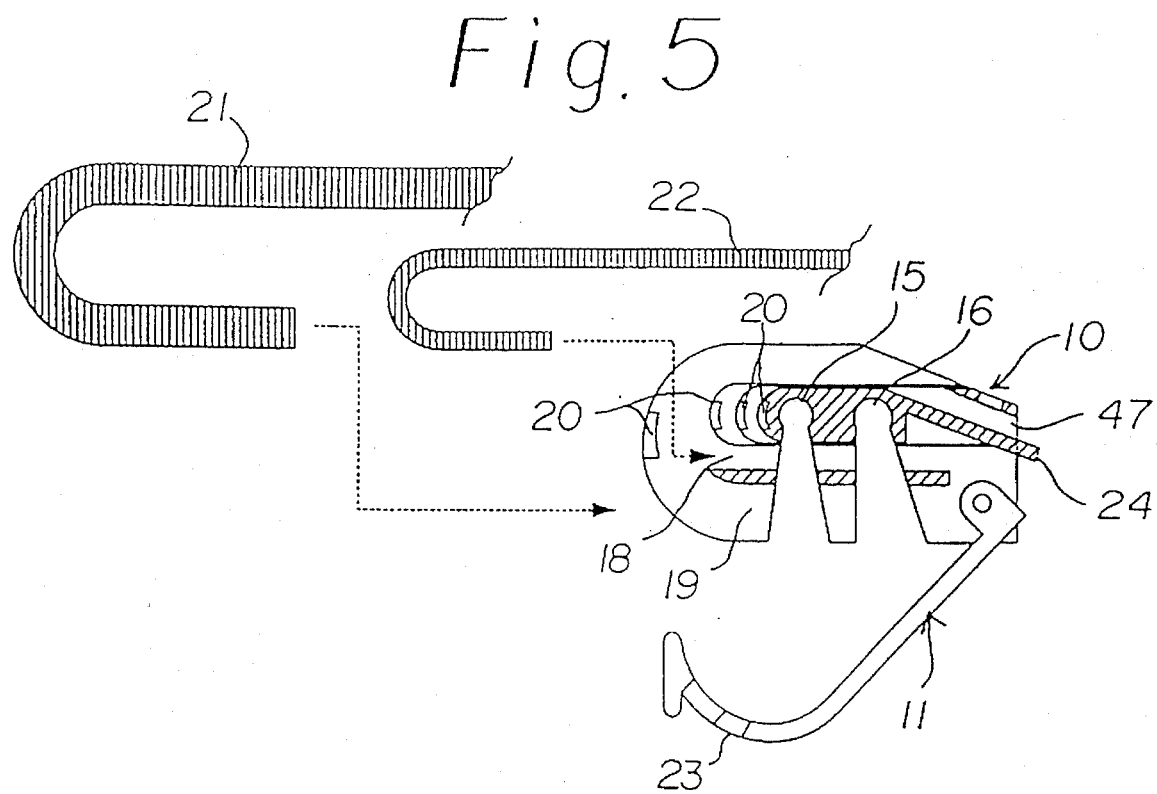
FIG. 5 is a sectional view of the windshield wiper frame connector of FIG. 3.

As shown in FIG. 5, the first hook type wiper arm 21 engages with the upper jam portion 17 and inserts into the lower space 19 as shown in FIG. 6(A). The second hook type wiper arm 22 engages with the upper jam portion 17 and inserts into the upper space 18 as shown in FIG. 6(B).

Also, the connector 10 according to the present invention can accommodate three different width hook type wiper arms of 7 mm, 8 mm, and 9 mm by slidably receiving and locking the hook type wiper arms through the pairs of stoppers 20, respectively. The pairs of stoppers 20 are disposed on an inner portion of the front wing portion 13. Two of the pairs of stoppers 20 are disposed on first and second raised portions 13a and 13b.

The conventional connector 1 can accommodate only one width of hook type wiper arm. For example, the connector 10 of the present invention can be used with a 9 mm wide hook portion, 8 mm wide hook portion and a 7 mm wide hook portion, while the conventional connector 1 would require three separate connectors, produced from three separate injection molds, each one of the three to be used with only one size hook portion. In addition, the wiper connector 10 of the present invention can be used with a first hook type wiper arm 21 having 11 mm diameter ($d_1$), and 4 mm thickness ($t_1$), and a second hook type wiper arm 22 having 8.8 mm diameter ($d_2$), and 2.5 mm thickness ($t_2$).

As shown in FIG. 3, the wiper connector 10 of the present invention is provided with a clip 11 as a safety locking device. The clip 11 has a curved neck portion 23 for tightly locking with the outermost pair of stoppers 20 of the connector 10 thereby retaining the clip in a closed position. The clip 11 further has a substantially straight portion pivotally connected to the pair of opposing sidewalls 14 for movement between an open position and the closed position. Accordingly, when the hook type wiper arms 21 and 22 are connected to the wiper connector 10, they cover both the first and second slots 15 and 16 and effectively tightly connect the connector 10 to the blade unit 30 (FIG. 2). At this time, the clip 11 of the wiper arms 21 or 22 can tightly lock the hook type wiper arm 21 or 22 as shown in FIGS. 6(A) and 6(B).

Figure 11:
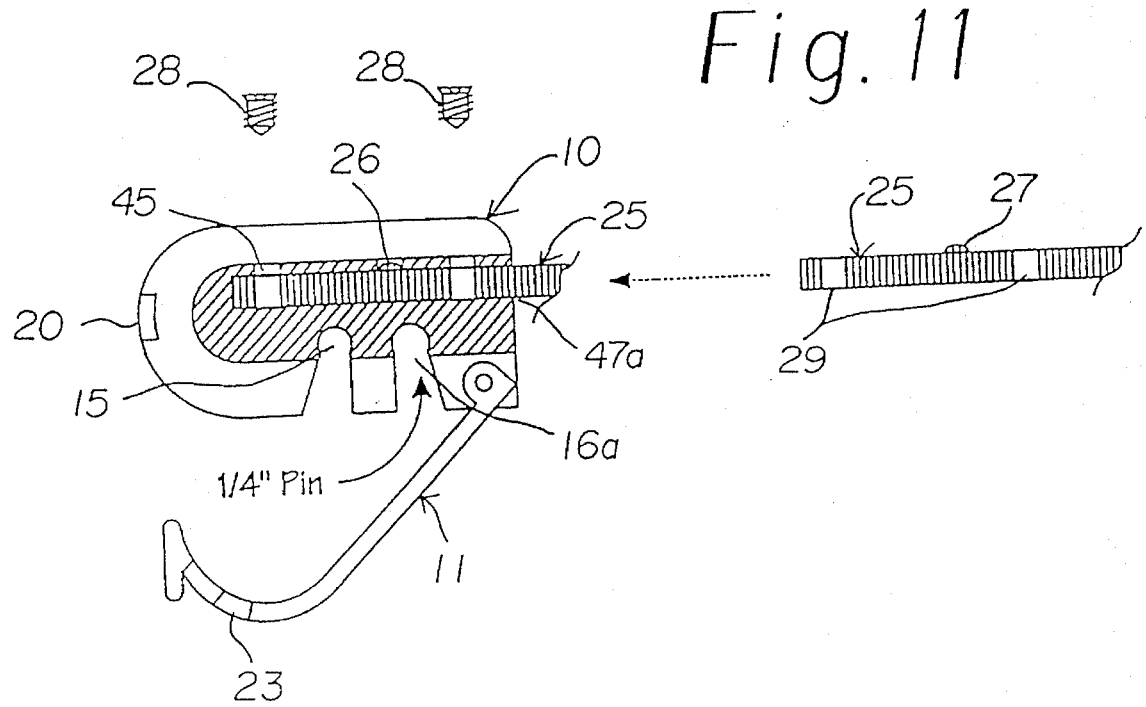
FIG. 11 is a sectional view of the windshield wiper frame connector as shown in FIG. 8, in assembly with a bayonet type wiper arm according to the present invention.

As shown in FIG. 2, the wiper blade unit 30 includes a bridge member 31, a pair of primary yokes 32 connected to the bridge member 31 and a pair of secondary yokes 33 each pivotally connected to one end of the respective primary yoke 32. Ends of the pair of secondary yokes 33 and the other end of the pair of primary yokes 31 are provided with a claw 34. The bridge member 31 includes the opening 35, a transverse pin 36, and a pair of first pin apertures 37 and a pair of second pin apertures 38. The first and second pin apertures 37, 38 have a diameter of approximately 4.8 mm and 6.4 mm, respectively, for slidably receiving 3/16 inch and 1/4 inch diameter pin type arms 40 and corresponding to different size slots 15, 16 (FIG. 11).

Also, referring in detail to FIG. 2, there is illustrated the windshield wiper frame connector 10 of the present invention for the pin type wiper arm 40. The pin type wiper arm 40 includes a pin holder 39 with an arm body 41, pin 42 having a pair of rolled bushings 43 and a reduced portion 44 for rotatably contacting an arc-shaped raised surface of the second slot 16 of the wiper frame connector 10. At this time, the reduced portion 44 of the pin 42 of the pin type wiper arm 40 can be tightly locked with the arc-shaped raised surface of the second slot 16. Also, the pair of rolled bushings 43 are rotatably inserted into the pair of first pin apertures 37 or second pin apertures 38.

Figure 6C:
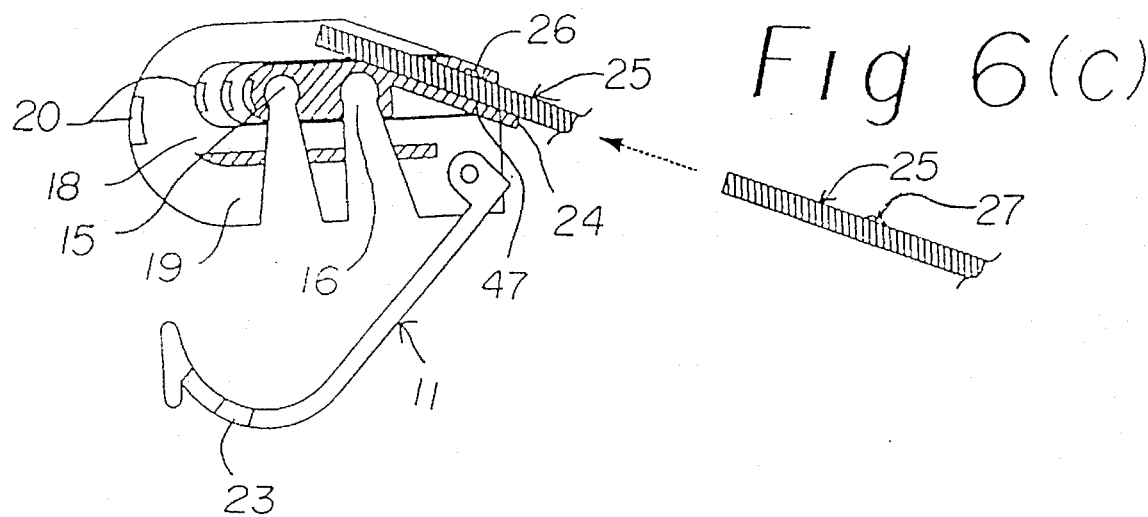
FIG. 6(C) is a sectional view of the windshield wiper frame connector slantingly assembled with a bayonet type wiper arm according to the present invention.
Figure 6D:
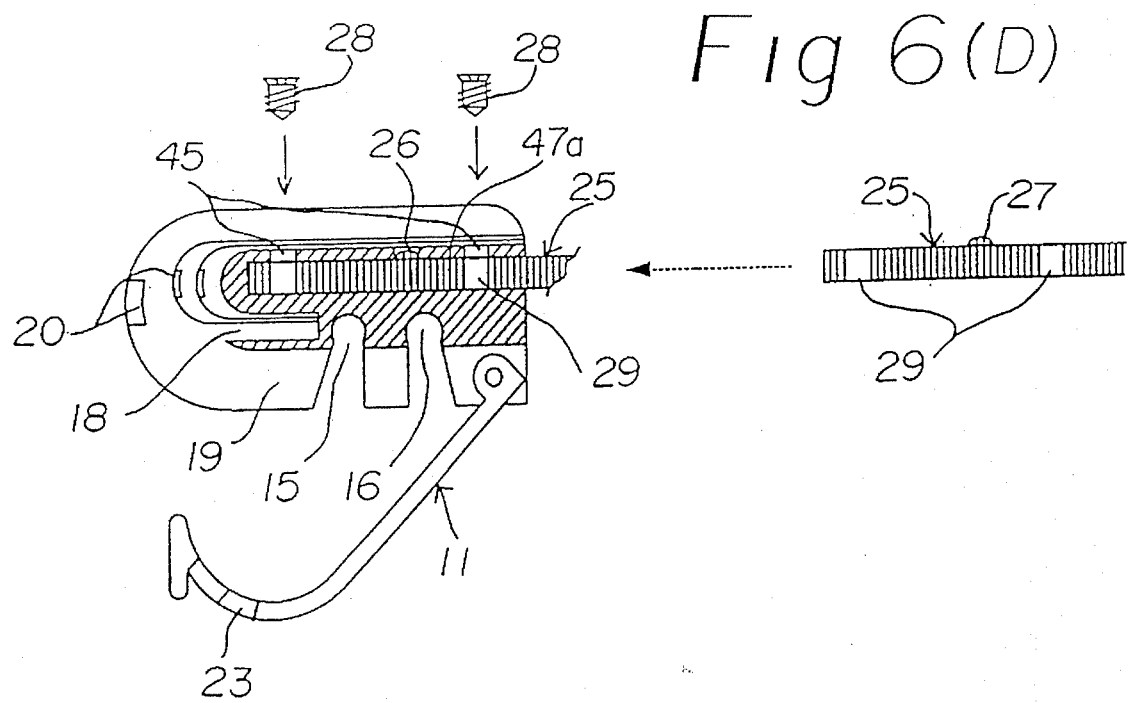
FIG. 6(D) is a sectional view of a second embodiment of the windshield wiper frame connector horizontally assembled with a bayonet type wiper arm according to the present invention.

There is illustrated the windshield wiper frame connector 10 of the present invention, with a bayonet type wiper arm 25 installed therein as shown in FIGS. 4, 6(C), and 6(D). The bayonet type wiper arm 25 includes a free end which is slidably received in an angled slot 47 in connector 10 wherein the angled slot has an angle of approximately 17°. The bayonet type wiper arm 25 is provided with a locking raised portion 27 which is received into a hole 26 disposed on the rear portion of the body member 12 and is tightly and slidably received by a bayonet lock tongue 24 disposed on the extreme rear portion of the body member 12 thereof as shown in FIG. 6(C). The blade unit 30 is then connected to the windshield wiper frame connector 10 via a transverse pin 36 in the same manner as for the hook type wiper arm 21 or 22 and the pin type wiper arm 40 discussed above.

If the angled slot 47 is a horizontal slot 47a as in a second embodiment shown in FIG. 6(D), the horizontal slot 47a tightly and horizontally receives a bayonet type wiper arm 25 having a pair of bayonet apertures 29 and the locking raised portion 27. At this time, the wiper connector 10 of the present invention includes a pair of connector apertures 45 and there are a pair of screws 28 for screwing the bayonet type wiper arm 25 to the wiper connector 10 of the present invention. Therefore, the bayonet type wiper arm 25 is tightly assembled with the connector 10 of the present invention by the pair of screws 28 and by engagement of the locking raised portion 27 and the hole 26 of the connector 10 as shown in FIG. 6(D).

Accordingly, the wiper frame connector 10 of the present invention can be easily used as an adapter for the blade unit 30 to connect to the hook type wiper arm 21, 22, or the pin type wiper arm 40, or the bayonet type wiper arm 25 if necessary. Furthermore, the wiper arms are tightly and securely connected to the blade unit 30 so that the wiper connector 10 of the present invention achieves an effective connecting operation and improves the wiping performance of the windshield wiper assembly as well as its operational lifetime.

Figure 7A:
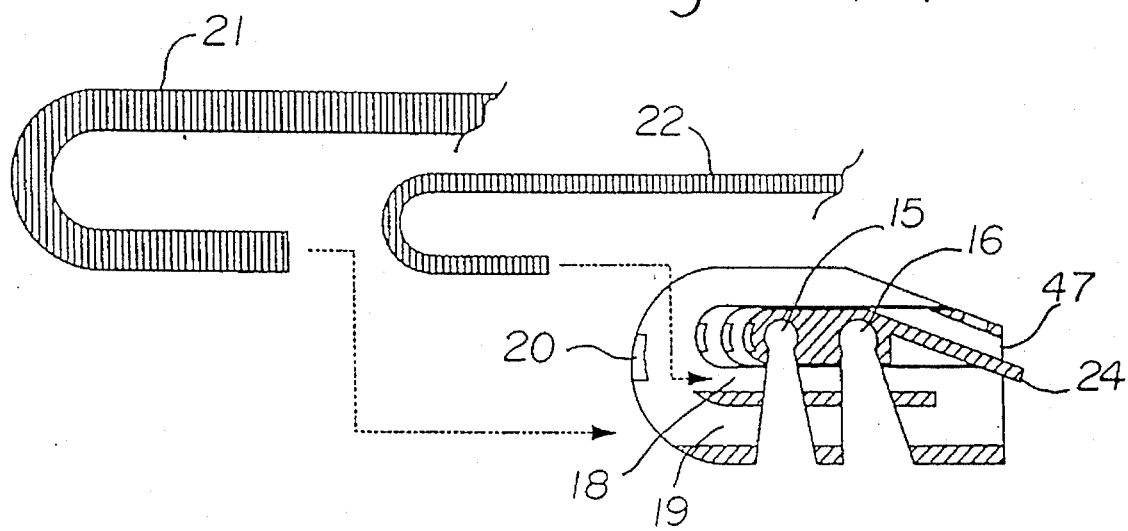
FIG. 7(A) is a sectional view of a third embodiment of the windshield wiper frame connector without a clip according to the present invention in combination with two hook type wiper arms of 9 mm width having 11 mm diameter and 4 mm thickness, and 8.8 mm diameter and 2.5 mm thickness.

Referring in detail to FIG. 7(A), there is illustrated a third embodiment of a wiper connector 10 in accordance with the present invention. The wiper connector 10 of the present invention includes the upper space 18 and the lower space 19 which are in a channelled configuration, respectively, instead of having a clip 11 as shown in FIG. 3. Therefore, the hook type wiper arms 21 and 22 are easily and tightly inserted into the upper and lower spaces 18 and 19.

Figure 7B:
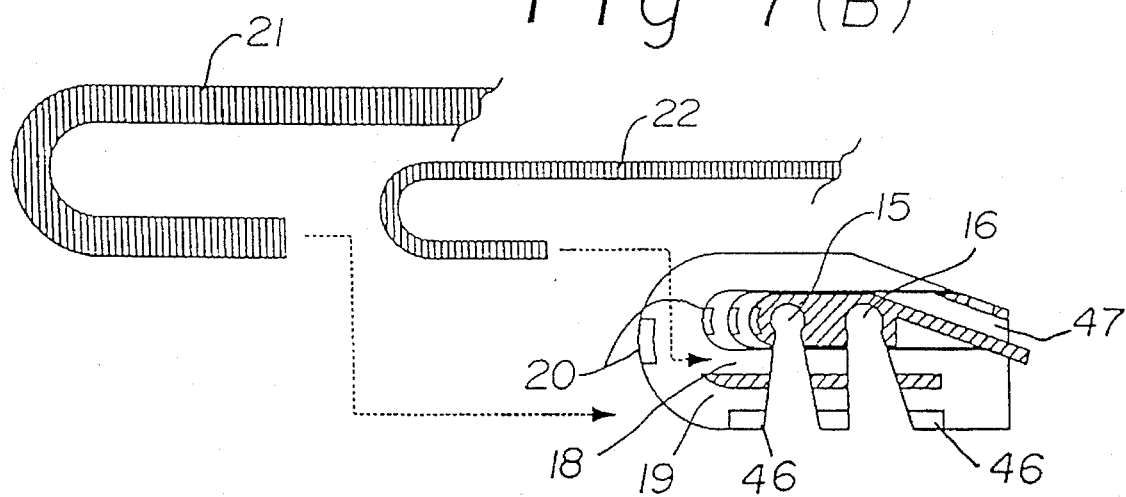
FIG. 7(B) is a sectional view of a fourth embodiment of the windshield wiper frame connector without a clip and with notches according to the present invention in combination with two hook type wiper arms of 9 mm width having 11 mm diameter and 4 mm thickness, and 8.8 mm diameter and 2.5 mm thickness.

As shown in FIG. 7(B), there is illustrated a fourth embodiment of a wiper connector 10 in accordance with the present invention, the wiper connector 10 includes the channelled upper space 18 and the lower space 19 with a plurality of notches 46 disposed below the lower space 19. Therefore, the hook type wiper arms 21 and 22 are easily and tightly inserted into the upper and lower spaces 18 and 19.

Referring in detail to FIGS. 8, 9, and 10, there is illustrated a fifth embodiment of a wiper connector 10 in accordance with the present invention. The wiper connector 10 of the present invention includes the clip having the neck portion 23 only the lower space 19 and the horizontal slot 47a for tightly receiving the hook type wiper arm 21 and the horizontal bayonet 25.

As shown in FIG. 11, a wiper connector 10 in accordance with the fifth embodiment is combined with a bayonet wiper 25. The wiper connector 10 of the present invention includes the small size slot 15 such as 3/16 inch diameter and a large size slot 16a such as 1/4 inch diameter for use in a 1/4 inch pin.

In these cases, the wiper connector 10 includes the clip 11 and the horizontal slot 47a for tightly receiving the horizontal bayonet 25 having the pair of bayonet apertures 29 by the bolts 28 as shown in FIG. 11.

Figure 12A:
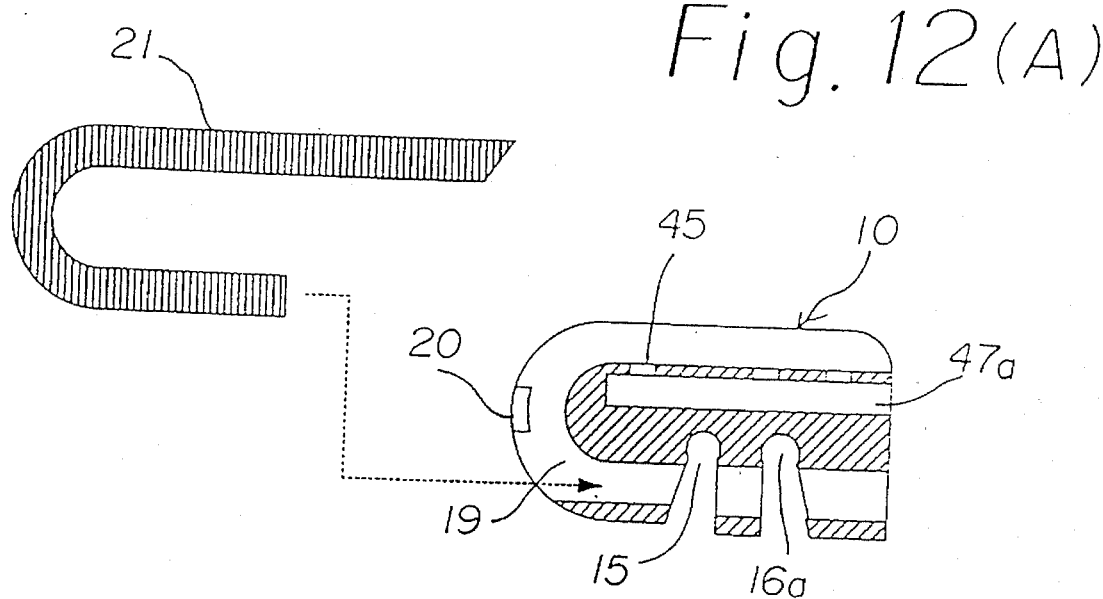
FIG. 12(A) is a sectional view of a sixth embodiment of the windshield wiper frame connector of FIG. 8 without a clip, in combination with a hook type wiper arm of a 9 mm width having 11 mm diameter and 4 mm thickness according to the present invention.
Figure 12B:
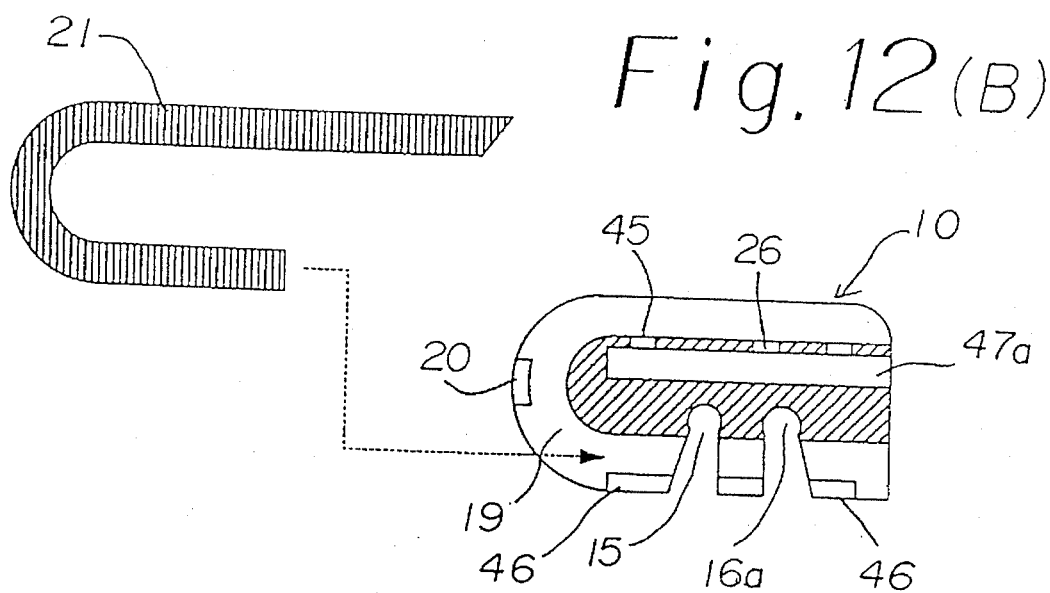
FIG. 12(B) is a sectional view of a seventh embodiment of the windshield wiper frame connector, without a clip and with a notch, and in combination with a hook type wiper arm of 9 mm width having 11 mm diameter and 4 mm thickness according to the present invention.

A sixth and a seventh embodiment are shown in FIGS. 12(A) and 12(B), respectively. In FIG. 12(A), the wiper connector 10 includes the channelled lower spaces 19 and without the clip 11 for tightly receiving the hook type wiper arm 21. Also, the wiper connector 10 of FIG. 12(B) includes notches 46 for tightly receiving the hook type wiper arm 22.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield wiper frame connector for connecting a wiper blade unit to a wiper arm, comprising:

an elongated body member defining a longitudinal axis therealong, said body member having a pair of opposing sidewalls, each of said sidewalls having a front wing portion as an extension of said sidewalls, said front wing portions defining opposing inner surfaces;

a first slot disposed in a lower portion of said body member for rotatably receiving a transverse pin of a wiper blade unit;

a second slot disposed in said lower portion of said body member adjacent to said first slot for rotatably receiving a pin of a pin type wiper arm;

a first pair of opposing raised portions disposed on said opposing inner surfaces of said front wing portions of the sidewalls;

a first pair of stoppers disposed on said opposing inner surfaces of said front wing portions;

a second pair of stoppers disposed on said first pair of raised portions;

an upper jam portion disposed on a top portion of said body member for tightly and smoothly receiving a hook type wiper member;

a lower space disposed in a lower portion of an interior of said body member for tightly receiving outer surfaces of a hook type wiper arm;

means for locking said hook type wiper arm to said windshield wiper frame connector, said means for locking including a clip member having a substantially straight portion and a substantially curved neck portion, said substantially straight portion being pivotally connected to said pair of opposing sidewalls for movement between an open position and a closed position, said substantially curved neck portion engaging said first pair of stoppers to thereby retain said clip member in said closed position and thereby locking said hook type wiper arm to said windshield wiper frame connector; and means for receiving a bayonet type wiper arm disposed in an upper and rear portion of said body member.

2. The windshield wiper frame connector of claim 1, wherein a second pair of opposing raised portions are disposed on said first pair of opposing raised portions on said opposing inner surfaces of said front wing portions of the sidewalls;

a third pair of stoppers are disposed on said second pair of raised portions, respectively;

said upper jam portion is disposed for tightly receiving said hook type wiper arm; and an upper space is disposed in a middle portion of the interior of said body member, adjacent said lower space, for tightly receiving outer surfaces of a hook type wiper arm of a second dimension.

3. The windshield wiper frame connector of claim 2, wherein said second slot is provided with an arc-shaped surface which cooperates with a reduced diameter portion of said pin of a pin type wiper arm.

4. The windshield wiper frame connector of claim 2, wherein said second slot has a larger size than said first slot for smoothly receiving a ¼ inch pin of the pin type wiper arm.

5. The windshield wiper frame connector of claim 2, wherein said means for receiving a bayonet type wiper arm is an angled slot having a hole disposed on a ceiling of said angled slot for tightly and smoothly receiving the bayonet type wiper arm having a raised portion disposed on the top thereof so as to mate with the hole.

6. The windshield wiper frame connector of claim 5, wherein said angled slot has an angle of approximately 17° with respect to the longitudinal axis.

7. The windshield wiper frame connector of claim 2, wherein said means for receiving a bayonet type wiper arm is a horizontal slot having a pair of apertures for fixing the bayonet type wiper arm by screws.

8. The windshield wiper frame connector of claim 2, wherein said pair first and second of opposing raised portions are spaced narrower than said inner surfaces of said front wing portions, such that a 7 mm and an 8 mm wide hook type wiper arm Can be tightly received between said first and second raised portions, respectively.

9. The windshield wiper frame connector of claim 2, wherein said second slot is provided with an arc-shaped surface which cooperates with a reduced diameter portion of said pin of a pin type wiper arm, said second slot having a larger size than said first slot for smoothly receiving a ¼ inch pin of the pin type wiper arm;

said means for receiving a bayonet type wiper arm is an angled slot having a hole disposed on a ceiling of said angled slot for tightly and smoothly receiving the bayonet type wiper arm having a raised portion disposed on the top thereof so as to mate with the hole; and said first and second pairs of opposing raised portions are spaced narrower than said opposing inner surfaces of said front wing portions, such that a 7 mm and an 8 mm wide hook type wiper arm can be tightly received between said first and second raised portions, respectively.

10. The windshield wiper frame connector of claim 1, wherein said means for receiving a bayonet type wiper arm includes a horizontal slot for receiving a horizontal bayonet type wiper arm.

11. The windshield wiper frame connector of claim 10, wherein said second slot has a larger size than said first slot for smoothly receiving a ¼ inch pin of the pin type wiper arm.

* * * * *